Patented Oct. 16, 1934

1,976,807

UNITED STATES PATENT OFFICE 1,976,807

PROTECTING COMPOSITION FOR MATERIALS AND PROCESS OF MAKING AND APPLYING THE SAME

Elmer R. Schaeffer, Crestwood, N. Y., assignor to The Philip Carey Manufacturing Company, a corporation of Ohio No Drawing. Application August 7, 1930, Serial No. 473,771

5 Claims. (Cl. 91—70)

This invention relates to paints and other compositions used for the protection or ornamentation of metallic or non-metallic surfaces and/or for the impregnation of absorbent materials and to processes of coating or impregnating substances with such compositions. This invention is particularly useful in the improvement of compositions which are liable to be subjected to the adverse action of vapors, oils and gases that occur in the refining and storage of crude and refined oils.

Heretofore difficulty has been encountered in the use of paints and other compositions containing drying oils where crude or refined oils or vapors therefrom come in contact with the paint or composition. Where a paint containing a drying oil is applied to the metal of an oil tank, for example, the oil will not oxidize or dry if it is in the presence of gasoline or crude oil vapors. Moreover where the paint is first permitted to dry and is later exposed to gases from petroleum which frequently contain sulphur compounds, the paint soon becomes blackened and begins to scale. The paint therefore is rapidly attacked by the vapors and soon loses its effectiveness as a protective coating. After the paint has thus been attacked, it becomes easily removable from the metal leaving it unprotected and liable to corrosion.

It is a purpose of this invention to coat or impregnate a substance with a protective composition which will resist the corrosive action of both crude and refined oils and gases therefrom, such as hydrogen sulphide, and which will stick adherently and permanently to materials to which the composition is applied.

This invention is particularly useful in the coating of metal surfaces such as the roofs of oil tanks, for example. A novel coating of the composition of this invention will stick to the metal and resist the action of the oil stored in the tanks and the corrosive vapors therefrom.

This invention is of particular advantage in that it affords a flexible coating for oil tank roofs, other metal parts for tanks for hydrocarbons, and the like. Not only is the coating non-corrosive but also it does not crack or break upon bending of a roof, for example, under stresses such as are caused by laborers thereon, etc., and does not become full of cracks and pores such as rapidly develop in ordinary paints and coatings when applied to oil tank roofs and the like which are subject to flexure. The novel coating of oil tank roofs, for example, of this invention is of particular advantage at joints in the roof, as such points in the roof are normally subject to greatest flexure. By the use of the novel non-corrosive and flexible coating for oil tank roofs of this invention, oil tank roofs can be made which remain substantially air and vapor tight for several years. This is of great advantage in that it prevents losses of vapors contained in the tanks. It has been found that differences in day and night temperatures cause large amounts of vapors to be expelled from oil tanks that have porous roofs. Since the expelled vapors are the most volatile and therefore normally the most valuable fractions, such breathing losses from oil tanks, unless checked, are extremely costly. Oil tank roofs in ordinary practice are made of a plurality of metal plates which are covered with heat insulating material and with an outside waterproof covering of asphalt impregnated material such as asphalt impregnated asbestos roofing felt. Where vapors escape through openings between the plates of the roof, the vapors not only are responsible for costly breathing losses but also rapidly deteriorate the asphalt impregnated waterproof covering material. Deterioration of the outside covering of asphalt impregnated material is of great practical disadvantage as it renders it liable to be torn and be blown off by winds and permits water to permeate therethrough to the injury of the heat insulating material thereunder. In addition to the above, the novel coating for oil tank roofs and other metal parts of this invention prevents the corrosion of metal so used. If metal oil tank roofs, etc. are not protected not only on the outside but on the inside as well, the presence of water vapor and sulphur and sulphur compounds in the vapors rising from oil, for example, stored in oil tanks tends to produce acids which rapidly corrode unprotected metal. With the coating of this invention sulphur or sulphur compounds are used as hardening ingredients thereof and consequently the sulphur compounds contained in vapors and fumes from oil stored in oil tanks actually aid in making the coatings of this invention more hard, impervious, and strong and such coatings are not deteriorated in any way by such sulphur compounds.

This invention is also of great advantage in the impregnation of absorbent materials such as gaskets and heat insulations with a firm bonding substance resistant to the corrosive action of petroleum and petroleum vapors and gases.

A coating and/or impregnating composition having the desirable, non-corrosive properties above mentioned consists, according to this invention, of the reaction product between a drying oil and sulphur or a substance containing sulphur available for reaction with said drying oil. It is a feature of this invention that the reaction product is not only non-corrosive but is well adapted to sticking to materials, thus forming a strongly adherent coating for surfaces or a tough strong impregnating composition for materials. It is a further feature of this invention that the reacting substances may be made to react in situ as coated on a surface or as impregnated in a material forming exceedingly strong and permanently adhering protective coating or impregnated composition.

Any drying oil may be used according to this invention such as linseed oil, China-wood oil, soya bean oil, peanut oil, corn oil, and the like. It is preferable, however, in the impregnation of material to be used for heat insulation purposes to avoid the use of oils which absorb oxygen with comparative rapidity and which therefore tend to cause spontaneous combustion, because, while the finished composition will not burn of itself except when mixed with inflammable material, it is possible that the oil might not be brought by the operator to full reaction with the sulphur, leaving some unreacted oil which might be liable to spontaneous combustion. Moreover, drying oil may be treated according to this invention either alone or admixed with other substances such as color or filler as in paint.

In treating drying oils with sulphur such as ordinary powdered sulphur according to this invention, the reaction between the sulphur and the oil can be accelerated by heating the mixed substances to a fairly high temperature such as 180° F. Preferably the temperature of the mixture should be kept below 250° F. in order to avoid boiling of the oil and danger from fire. A temperature of 200° F. should normally be sufficient, though the temperature required varies somewhat with the character of the drying oil used. Thus, for example, the reaction between corn oil and sulphur will proceed at a considerably lower temperature than 180° F. though even with corn oil the speed of the reaction can be increased materially by heating it to about 180° F.

In addition to treating a drying oil with sulphur, a drying oil may also be treated according to this invention with compounds of sulphur such as sulphur chloride containing sulphur available for reaction with the drying oil. Where sulphur chloride is used the application of artificial heat is not necessary as the reaction between the drying oil and the sulphur chloride is exothermic and the heat of reaction is sufficient to supply heat for accelerating the reaction to desired extent. The use of sulphur chloride is therefore regarded as preferable according to this invention. A drying oil may be treated according to this invention simply by adding sulphur chloride thereto in small quantities while stirring. For example, to two gallons of corn oil, ⅓ of a gallon of sulphur chloride may be added while stirring the oil vigorously. This process requires about five minutes during which time the temperature of the oil will increase to about 200° F.

The reaction product between drying oil and sulphur or a drying oil and a substance containing sulphur available for reaction with said drying oil such as sulphur chloride, is a viscous compound which is insoluble in water and in crude or refined oils and is unaffected by hydrogen sulphide and other gases which are occasionally found in petroleum or occur in the refining and storing of petroleum. The consistency of composition can be controlled by the amount of sulphur or sulphur containing substance which is used. With increase in the amount of sulphur, the reaction product becomes increasingly viscous and sticky and by increasing the amount sufficiently a stiff wax or gum can be produced. For example, where 2 gallons of drying oil are reacted with ⅓ gallon of sulphur chloride, in the example above given, the reaction product is an extremely viscous, sticky substance. By slightly increasing the amount of sulphur chloride, a stiff gum is produced.

A surface such as an oil tank roof may be readily coated with a protective composition according to this invention by heating a mixture of a drying oil and sulphur and then applying the mixture to the surface to which it is to be applied before the reaction between the sulphur and the drying oil is complete. The resultant semi-viscous mix has been found to stick adherently to metal. After application to the surface, the reaction between the sulphur and drying oil gradually comes to completion producing a tough viscous permanent protective coating having the desirable non-corrosive properties above mentioned. A further application of sulphur chloride to the composition thus coated would tend to harden the composition to a stiff gum, though such an application of sulphur chloride is not necessary according to this invention. Other substances containing sulphur available for reaction with a drying oil besides powdered sulphur may be similarly used according to this invention, heat being applied or not as may be desirable.

A protective coating may also be applied according to this invention by first applying sulphur chloride, for example, to the surface to be coated as by spraying the surface and later painting a drying oil thereon. In such case the sulphur chloride will react with the drying oil to produce a gummy non-corrosive coating. It is a highly advantageous feature of this invention that additional alternate coats of sulphur chloride and oil may be readily added very much like second and third coats of paint thus building up an extremely durable non-corrosive coating. While it is preferable that the last coating should be a coating of sulphur chloride so that it may react with the coating of drying oil to which it is applied to form a tough resistant exterior surface, it is a matter of indifference whether the oil or sulphur chloride is applied as a first coating to the surface to be coated. Moreover, a drying oil partially reacted with sulphur or sulphur chloride may be employed in several successive coats according to this invention.

A protective composition may be impregnated in material such as absorbent materials, e. g., asbestos, useful, for example, for sheet gaskets or heat insulation, etc., for fittings on pipes, and containers for crude oil and the like, according to this invention, preferably by partially reacting a drying oil with sulphur or with a substance containing sulphur available for reaction with a drying oil, impregnating the material with the partially reacted substances before the reaction between them is completed, and then substantially completing the reaction, heat being applied to that end if necessary as hereinabove described. A coating of sulphur or sulphur chloride, for example, applied to the exterior of such an impregnated material would increase the hardness and toughness of the composition at the exterior surface. It is to be understood that any other method of introducing into a material a drying oil and sulphur available to react therewith either prior to reaction between those substances or after only partial reaction between them, as by mixing said substances with finely divided, fibrous, shredded, etc., materials and pressing the mixture to required shapes may be employed according to this invention, the final product, after the reaction between the drying oil and the sulphur available to react therewith has been substantially completed, being impregnated with a reaction product which is not only strong and tough but also is resistant to the corrosive action of petroleum oils and gases and vapors therefrom. Heat insulations, gasket materials and the like made of asbestos, for example, may be impregnated as above described according to this invention.

While hereinabove specific examples of this invention have been set forth, it is to be understood that this has been for the purpose of illustration only, and that the true scope of this invention is in nowise limited thereby.

I claim:

1. A process of preparing and applying a protective composition as a coating for a surface of a structure, which comprises mixing a drying oil with powdered sulphur, heating said mixture of drying oil and sulphur, maintaining said mixture in a heated condition until there is partial reaction between said drying oil and sulphur, then applying said partially reacted mixture of drying oil and sulphur to said surface, and permitting said partially reacted mixture of drying oil and sulphur to stand on said surface without the application of heat, thereby causing the reaction between said drying oil and sulphur to come to substantial completion in situ on said surface so as to form a strong, gummy, non-corrosive coating therefor.

2. A process of applying a protective coating to an oil tank roof, which comprises mixing a drying oil with powdered sulphur, heating said mixture of drying oil and sulphur to a temperature between about 180° F. and about 200° F., maintaining said mixture at a temperature between about 180° F. and about 200° F. until there is partial reaction between said drying oil and sulphur, then applying said partially reacted mixture of drying oil and sulphur to said oil tank roof, and permitting said partially reacted mixture of drying oil and sulphur to stand on said roof without the application of heat, thereby causing the reaction between said drying oil and sulphur to come to substantial completion in situ on said roof so as to form a strong, gummy, non-corrosive coating therefor.

3. A process of impregnating a material with a non-corrosive composition, said process comprising mixing a drying oil with sulphur chloride, permitting the drying oil and sulphur chloride to partially react, impregnating said material with said partially reacted drying oil and sulphur chloride, and permitting the reaction between said drying oil and sulphur chloride to be substantially completed in situ, thereby impregnating said material with a tough, gummy, non-corrosive material.

4. In a roof for oil tanks, a metal roof deck in combination with flexible, non-corrosive and adherent coating comprising the product of reaction in situ between a drying oil and a substance containing sulphur available for reaction with said drying oil.

5. In a roof for oil tanks, a metal roof deck in combination with flexible, non-corrosive and adherent coating comprising the product of reaction in situ between a drying oil and sulphur chloride.

ELMER R. SCHAEFFER.